United States Patent
Wu et al.

(10) Patent No.: US 9,572,084 B2
(45) Date of Patent: Feb. 14, 2017

(54) METHOD AND SYSTEM FOR ROUTE OPTIMIZATION DURING HANDOVER AND ACCESS NETWORK ELEMENT

(71) Applicant: ZTE Corporation, Guangdong (CN)

(72) Inventors: Qiang Wu, Shenzhen (CN); Hua Jiang, Shenzhen (CN); Tao Fu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 139 days.

(21) Appl. No.: 14/358,080

(22) PCT Filed: Nov. 1, 2012

(86) PCT No.: PCT/CN2012/083925
§ 371 (c)(1),
(2) Date: Aug. 7, 2014

(87) PCT Pub. No.: WO2013/071823
PCT Pub. Date: May 23, 2013

(65) Prior Publication Data
US 2014/0341186 A1 Nov. 20, 2014

(30) Foreign Application Priority Data
Nov. 14, 2011 (CN) .......................... 2011 1 0358549

(51) Int. Cl.
*H04W 40/36* (2009.01)
*H04W 36/00* (2009.01)
*H04W 8/14* (2009.01)

(52) U.S. Cl.
CPC ......... *H04W 40/36* (2013.01); *H04W 36/0055* (2013.01); *H04W 8/14* (2013.01)

(58) Field of Classification Search
CPC ..... H04W 36/0055; H04W 40/36; H04W 8/14
(Continued)

(56) References Cited

U.S. PATENT DOCUMENTS 8,611,892 B2 * 12/2013 Iwasaki ................. H04W 40/36
455/436
2002/0150062 A1 * 10/2002 Zheng ..................... H04L 45/00
370/331
(Continued)

FOREIGN PATENT DOCUMENTS

CN 101119312 A 2/2008
CN 102026318 A 4/2011
(Continued)

OTHER PUBLICATIONS

International Search Report for PCT/CN2012/083925 dated Jan. 15, 2013.

*Primary Examiner* — Kokou R Detse
(74) *Attorney, Agent, or Firm* — Ling Wu; Stephen Yang; Ling and Yang Intellectual Property (57) ABSTRACT

A method and system for route optimization during switching and an access network element. In a process that a terminal is switched from a source access network element to a target access network element, the target access network element obtains identity information of a correspondent node of the terminal from the terminal, and triggers an access network element of the correspondent node to update a correspondent node mapping relationship. In the present solution, information of a correspondent node is obtained by adding a signaling interaction procedure between the network and the terminal host, so that the information of the correspondent node which is performing data communication is obtained in real time, and a subsequent data stream route optimization process is performed in time, thereby solving the problem of low processing performance and poor real-time performance resulted from an access gateway monitoring, detecting and maintaining correspondent node information.

14 Claims, 3 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2006/0072512 A1* | 4/2006 | Das ....................... | H04W 80/00 370/335 |
| 2007/0177549 A1 | 8/2007 | Lo et al. | |
| 2009/0059866 A1* | 3/2009 | Chen ................. | H04W 36/0011 370/331 |
| 2010/0008328 A1* | 1/2010 | Maheshwari ..... | H04W 36/0055 370/331 |
| 2010/0190500 A1* | 7/2010 | Choi ..................... | H04W 36/36 455/436 |
| 2011/0007632 A1* | 1/2011 | Turanyi ................ | H04W 8/082 370/235 |
| 2013/0058308 A1* | 3/2013 | Jaiswal ................. | H04W 36/12 370/331 |

FOREIGN PATENT DOCUMENTS

| | | | |
|---|---|---|---|
| CN | 102045693 A | 5/2011 | |
| CN | 102196402 A | 9/2011 | |
| WO | 2004107702 A1 | 12/2004 | |

* cited by examiner

METHOD AND SYSTEM FOR ROUTE OPTIMIZATION DURING HANDOVER AND ACCESS NETWORK ELEMENT

TECHNICAL FIELD

The present document relates to the communication technology field, and in particular, to a method and system for route optimization during switching and an access network element.

BACKGROUND OF THE RELATED ART

The traditional IP network does not support the terminal mobility, and in the related art, all kinds of different solutions are proposed, mainly including the mobile IPv4, the mobile IPV6, the agent mobile IPV6 of the IETF, the GPRS Tunneling Protocol (abbreviated as GTP) mode of the 3GPP, etc. This technology supports the terminal mobility by adopting the mode of the fixed anchor point, such as, the GPRS supporting node (GGSN) is stipulated in the WCDMA as the terminal mobile anchor; the mobile IP protocol is adopted in the CDMA network, and a local agent (HA) is treated as the anchor point. But the fixed anchor point will bring the problem that the data packet route is indirect, thus increasing the transmission delay and the bandwidth waste. With the development of the mobile wireless packet technology, such as, 2G/3G/4G, etc. the number of users and the flow rate in the mobile Internet are increased gradually, and a gateway device, such as, a GGSN, etc., shifts downward gradually, which will make the problem of the indirect route more serious.

The technology 1 correlated to the present document:

the patent application 1 of which the application number is 200910174823.5: "Method for obtaining/notifying information, forwarding and switching data message, and an access node".

The above-mentioned patent application 1 proposes a switching management method and data message forwarding method under the Location-ID separation architecture based on the network, which solves the indirect route problem in the communication process of the mobile terminal data. What is involved during the switching is that:

(1). after the location of a mobile node is changed, the access gateway to which the mobile node is switched allocates a new location identification for the mobile node, and the mobile node will communicate with the correspondent node by using the new location identification;

(2). in order to ensure an optimal data forwarding path between the mobile node and the correspondent node, the access gateway to which the mobile node is switched initiates a procedure for updating the correspondent node mapping to realize the route optimization;

(3). in a procedure of updating the correspondent node mapping, the access gateway needs to obtain the correspondent node information, to determine which correspondent nodes it initiates the procedure of updating the correspondent node mapping to;

(4). in the method disclosed in the above-mentioned patent application, the access gateway mainly obtains the correspondent node information by monitoring and detecting the data flow, and maintaining information of the correspondent node which is performing the data communication with the mobile node.

The main problems in the patent application 1 are as follows:

(1). in order to acquire the correspondent node information, the access gateway needs to monitor and detect the data flow to judge the existence condition of the connection of the end-to-end host to maintain information of the correspondent node which is performing the communication with the mobile node. That process has consumed a large amount of handling capacity of the access gateways.

(2). the access gateway defines the aging mode of the correspondent node table, and the basic principle is to monitor the data flow of both ends of the communication; if there are data flows forwarded in a certain time period T1, then it means that the communication with the correspondent node is on-going; otherwise, the correspondent node in the correspondent node table is aged. Wherein, 1) if the both ends of the communication keep the communication connection, but there is no data message sent in a certain time period T2, and T2>T1, then the access gateway ages the connection of the both ends of the communication at this moment; 2) if the set value of T1 is too large, then after the service connection of the both ends of the communication is disconnected, the longest time required by the access gateway to age the connection of the both ends of the communication is T1. In the above-mentioned case, the correspondent node table of the access gateway cannot reflect the situation of the end-to-end communication connection in real time.

The technology 2 correlated to the present document:

the Location-ID Separation Protocol (abbreviated as LISP) adopts the route technology, and changes the current route topology structure to some extent, utilizes the minimum transformation to optimize the current route transport technology by combining the current transport network.

The host uses the IP address (called the end identification EID in the LISP system) to track socket connections, send and receive data packets.

The router transmits the data packets based on the IP destination addresses (route locations RLOCs).

The tunnel routers are introduced into the LISP system, the encapsulation is performed while initiating the host packet, and the data packet is de-capsulated before transmitting to the destination place finally. In an LISP data packet, the IP address of "the outer layer header" is RLOC. In the procedure of performing the end-to-end packet switching between the hosts of two networks, the ITR encapsulates each packet with a new LISP head, and strips the new head at the egress channel route. The ITR performs the EID-to-RLOC searching to determine the route path to the ETR, and the ETR regards the RLOC as its one address.

The proposition of the LISP is not to solve the mobility problem, while mainly solves the problem of the network size and aims at the problem that the route table is too big; for the problem that the mobility and the multi-home are solved incidentally after location-ID separation, there is no specific scheme and implementation method now.

The method of an access gateway monitoring, detecting and maintaining the correspondent node information defined in the solution of the patent application 1 consumes a large amount of processing capacity of the access gateway, and the real time performance is bad; the solution of realizing the route optimization during the switching is not found in the related art 2.

SUMMARY OF THE INVENTION

The technical problem required to be solved by the present document is to provide a method and system for route optimization during switching and an access network element, which solve the problem of low processing performance and poor real-time performance resulted from an access gateway monitoring, detecting and maintaining correspondent node information.

In order to solve the above-mentioned technical problem, the present document provides a method for route optimization during switching, wherein, in a process that a terminal is switched from a source access network element to a target access network element, the target access network element obtains identity information of a correspondent node of the terminal from the terminal, and triggers an access network element of the correspondent node to update a correspondent node mapping relationship.

Preferably, the above-mentioned method further can have the following characteristics:

when a data message between the terminal and the correspondent node is forwarded between the source access network element and the target access network element, the data message is forwarded by means of tunnel encapsulation.

Preferably, the above-mentioned method further can have the following characteristics:

the target access network element obtains the identity identification information of the correspondent node of the terminal from the terminal by means of: the target access network element initiating a procedure of inquiring information of the correspondent node which is communicating with the terminal to the terminal, and the terminal sending the identity information of the correspondent node to the target access network element.

Preferably, the above-mentioned method further can have the following characteristics:

the target access network element initiates the inquiry procedure to the terminal after receiving an access completion indication of the terminal.

Preferably, the above-mentioned method further can have the following characteristics:

the access network element is an access service router (ASR) or an egress tunnel router (ETR).

In order to solve the above-mentioned technical problem, the present document provides a system for route optimization during switching, comprising a source access network element, a target access network element and a terminal, wherein, the access network element comprises a route optimization module; wherein, the target access network element is configured to: in a process that a terminal is switched from the source access network element to the target access network element, obtain identity information of a correspondent node of the terminal from the terminal, and trigger an access network element of the correspondent node to update a correspondent node mapping relationship.

Preferably, the above-mentioned system further can have the following characteristics:

the target access network element is further configured to: forward a data message between the terminal and the correspondent node to the source access network element by means of tunnel encapsulation, and the source access network element is further configured to: forward the data message between the terminal and the correspondent node to the target access network element by means of tunnel encapsulation.

Preferably, the above-mentioned system further can have the following characteristics:

the target access network element is further configured to: initiate a procedure of inquiring information of the correspondent node which is communicating with the terminal to the terminal, and receive the identity information of the correspondent node returned by the terminal.

Preferably, the above-mentioned system further can have the following characteristics:

the target access network element is further configured to: initiate the inquiry procedure to the terminal after receiving an access completion indication of the terminal.

In order to solve the above-mentioned technical problem, the present document provides an access network element for route optimization during switching, comprising a route optimization module; wherein, the route optimization module is configured to: when the access network element is a target access network element to which a terminal is switched from a source access network element during the switching, obtain identity information of a correspondent node of the terminal from the terminal, and trigger an access network element of the correspondent node to update a correspondent node mapping relationship.

Preferably, the above-mentioned access network element further can have the following characteristics:

the route optimization module is further configured to: forward a data message between the terminal and the correspondent node to the source access network element by means of tunnel encapsulation.

Preferably, the above-mentioned access network element further can have the following characteristics:

the route optimization module is configured to: initiate a procedure of inquiring information of the correspondent node which is communicating with the terminal to the terminal, and receive the identity information of the correspondent node returned by the terminal.

Preferably, the above-mentioned access network element further can have the following characteristics:

the route optimization module is further configured to: initiate the inquiry procedure to the terminal after receiving an access completion indication of the terminal.

Preferably, the above-mentioned access network element further can have the following characteristics:

the access network element is an access service router (ASR) or an egress tunnel router (ETR).

In the present scheme, information of a correspondent node is obtained by adding a procedure of signaling interaction between the network and the terminal host, so that the information of the correspondent node which is performing data communication is obtained in real time, and a subsequent data stream route optimization process is performed in time, thereby solving the problem of low processing performance and poor real-time performance resulted from the access gateway monitoring, detecting and maintaining correspondent node information. The present scheme fully considers simplifying the switching procedure, and the access gateway does not need to maintain the correspondent node information by monitoring and detecting the data stream, thus reducing the complexity of processing the data stream of the access gateway and improving the real-time performance of the correspondent node information in the mapping updating process.

PREFERRED EMBODIMENTS OF THE INVENTION

The method for route optimization during switching includes the following steps: in a process that a terminal is switched from a source access network element to a target access network element, the target access network element obtains identity information of a correspondent node of the terminal from the terminal, and triggers an access network element of the correspondent node to update a correspondent node mapping relationship.

In the present method, the target access network element obtains the identity information of the correspondent node of the terminal from the terminal, which can save the processing procedure of the target access network element monitoring the data on both ends, and can acquire the information of the correspondent node accurately and timely.

When a data message between the terminal and the correspondent node is forwarded between the source access network element and the target access network element, the data message is forwarded by means of tunnel encapsulation. Compared to the way that the both transmit the correspondent node table in the related art, the present way is easy and efficient.

That the target access network element obtains the identity identification information of the correspondent node of the terminal from the terminal specifically includes: the target access network element initiating a procedure of inquiring information of the correspondent node which is communicating with the terminal to the terminal, and the terminal sending the identity information of the correspondent node to the target access network element.

The target access network element initiates the inquiry procedure to the terminal after receiving an access completion indication of the terminal.

The access network element is an access service router (ASR) or an egress tunnel router (ETR).

A system for route optimization during switching corresponding to the above-mentioned method includes a source access network element, a target access network element and a terminal, wherein, the target access network element is configured to: in a process that a terminal is switched from the source access network element to the target access network element, obtain identity information of a correspondent node of the terminal from the terminal, and trigger an access network element of the correspondent node to update a correspondent node mapping relationship.

The target access network element is further configured to: forward a data message between the terminal and the correspondent node to the source access network element by means of tunnel encapsulation, and the source access network element is further configured to: forward the data message between the terminal and the correspondent node to the target access network element by means of tunnel encapsulation.

The target access network element is further configured to: initiate a procedure of inquiring information of the correspondent node which is communicating with the terminal to the terminal, and receive the identity information of the correspondent node returned by the terminal.

The target access network element is further configured to: initiate the inquiry procedure to the terminal after receiving an access completion indication of the terminal.

An access network element for route optimization during switching corresponding to the above-mentioned method includes a route optimization module; wherein, the route optimization module is configured to: when the access network element is a target access network element to which a terminal is switched during the switching, obtain identity information of a correspondent node of the terminal from the terminal, and trigger an access network element of the correspondent node to update a correspondent node mapping relationship.

The route optimization module is further configured to: forward a data message between the terminal and the correspondent node to the source access network element by means of tunnel encapsulation.

The route optimization module is configured to: initiate a procedure of inquiring information of the correspondent node which is communicating with the terminal to the terminal, and receive the identity information of the correspondent node returned by the terminal.

The route optimization module is further configured to: initiate the inquiry procedure to the terminal after receiving an access completion indication of the terminal.

The access network element is an access service router (ASR) or an egress tunnel router (ETR).

The embodiment of the present document proposes a method for realizing route optimization during switching by combining with the current background technology, and it will be described by combining the specific scenario hereinafter.

Embodiment One

Figure 1:
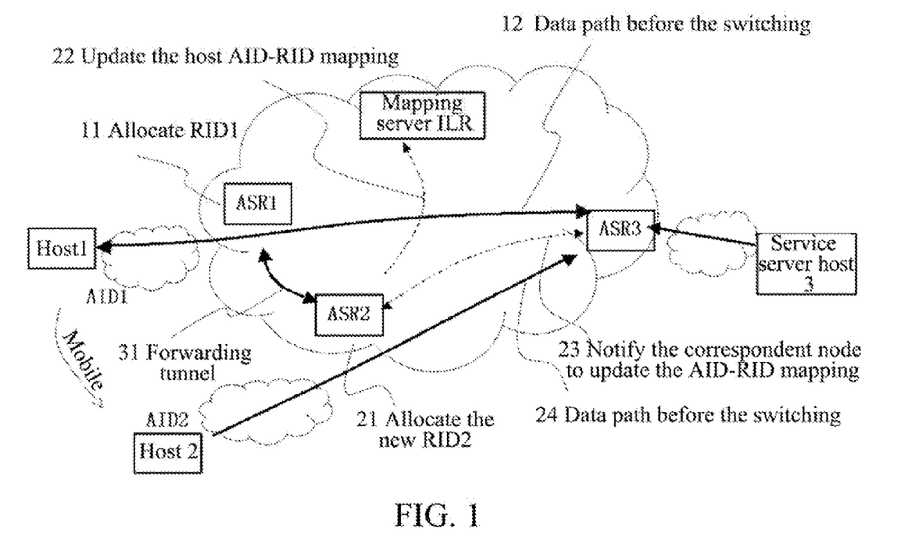
FIG. 1 is a diagram of a switching scenario in embodiment one.

As shown in FIG. 1, in the switching management diagram under the scenario of the related art 1, the access service router (ASR) is an access gateway, responsible for the service functions, such as access management and switching management of a host, etc., and transceiving data messages of the host; a mapping server (ILR) stores the corresponding relationship between an identity AID and a location identification RID of the host. The access management for HOST1 is performed by the access gateway ASR1, and the access management for HOST3 is performed by the access gateway ASR3. The access gateway ASR1 allocates the location identification RID1 for the HOST1 (11 in the figure). The host HOST1 is performing the data communication with the correspondent node HOST3. At this moment, the HOST1 adopts the encapsulation of the location identification RID1 to perform data transceiving with the correspondent node, and a transceiving path of the data message is shown as 12 in the figure, and it is forwarded through ASR1 and ASR3.

After the location of the HOST1 is moved from ASR1 to ASR2, the ASR2 allocates a new location identification RID2 (21 in the figure) for the HOST1; the ASR2 registers a new location identification (22 in the figure) to the mapping server for the HOST1; the ASR2 initiates a mapping updating procedure (23 in the figure) to the access gateway ASR3 accessed by the correspondent node; after the mapping updating procedure is completed, at this moment, the HOST1 adopts the encapsulation of the location identification RID2 to perform the data transceiving with the correspondent node, and the transceiving path of the data message is shown as 24 in the figure, and it is forwarded through ASR2 and ASR3.

During the switching, the ASR1 and the ASR2 establish a forwarding tunnel (31 in the figure), to forward the data message between the HOST1 and the HOST2.

Figure 2:
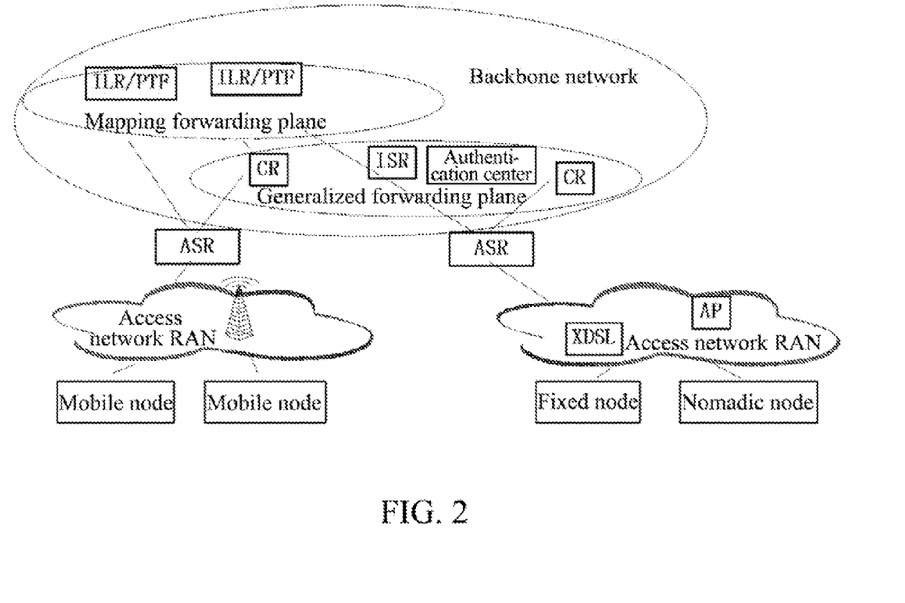
FIG. 2 is a diagram of a network topology in embodiment one.

The network topology in the above-mentioned scenario is shown in FIG. 2. The mobile node MN and the correspondent node CN will initiate a register procedure to the ILR through the ASR when it starts up or the location changes, in this way, the corresponding ILRm stores the mapping relationship of the real-time AIDm-RIDm of the mobile node MN, and the corresponding ILRc stores the mapping relationship of the real-time AIDc-RIDc of the correspondent node CN. After the ASR receives the data message sent by the mobile node MN, it inquires from the local storage area according to the correspondent node, that is, the destination AIDC, encapsulates the data message with the location identification RIDs of the source end and destination end after obtaining the AIDc-RIDc mapping, and sends the data message to the generalized forwarding plane for routing. If the AIDc-RIDc mapping is not obtained in the local storage area, the data message is routed to the mapping forwarding plane for processing. Meanwhile, the ASR initiates an inquiry mapping procedure to the mapping forwarding plane, obtains the corresponding AIDc-RIDc mapping from the mapping forwarding plane, and then stores it in the local cache, preparing for the inquiry when the subsequent message is forwarded.

Figure 3:
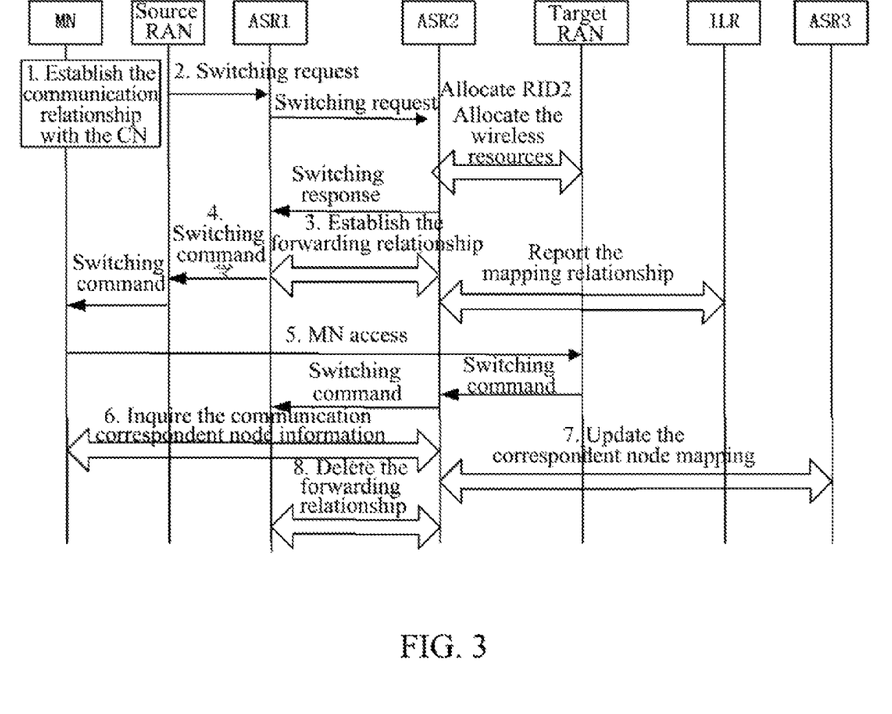
FIG. 3 is a diagram of a route optimization method and a switching management flow in embodiment one.

As shown in FIG. 3, the specific realization method aiming at the above-mentioned scenario in the present embodiment one includes the following steps:

in step 1, it is a step of the correspondent node CN and the mobile node MN establishing the communication relationship, and the correspondent node CN receives and sends the data message after inquiring the location of the mobile node MN.

In step 2, it is a step of initiating the switching, and the wireless link triggers the switching procedure after detecting the mobility of the mobile terminal.

The wireless access system initiates the switching by combining the distribution situation of the wireless resources according to the information such as the strength of the wireless signal of the mobile user terminal MN, the system load, etc., and carries information about the target coverage area and the user terminal in the switching request message sent by the wireless access system.

After the ASR1 from which the MN is switched out receives the switching request message sent by the wireless access system, the ASR1 finds out the ASR2 to which the MN is switched according to the target coverage area, sends the switching request message to the ASR2, and the switching request message carries the user terminal information.

After the ASR2 receives the switching request message, it allocates the new route location identification RIDm2 for the user MN, establishes the mapping relationship of the user AIDm-RIDm2 in the ASR2. The ASR2 and the wireless access system perform the message interaction to allocate the wireless resources.

The ASR2 sends the switching request response message to the ASR1.

In step 3, a gateway ASR1 from which the MN is switched out and a gateway ASR2 to which the MN is switched establish the forwarding relationship.

After the ASR1 receives the switching response message sent by the ASR2, the ASR1 and the ASR2 will store the switching state for the mobile user MN. During the switching state, the ASR1, as a switching agent node, will forward data messages, which are sent from/to the ASR2, for the mobile user MN. At this moment, as one of the data message delivery paths of the mobile node MN, the transceiving path of the data message is: CN←→ASRc←→ASR1←→ASR2←→MN, wherein the ASRc is an access service node accessed by the correspondent node CN.

The possible forwarding way between the ASR1 and the ASR2 is the tunnel encapsulation way. When the ASR1 receives the data messages which are from the ASR2 and sent by the MN, the tunnel encapsulation between the ASR1-ASR2 is striped and the data message are sent to the correspondent node CN. When the ASR1 receives the data messages which are from the correspondent node CN and sent to the MN, the tunnel encapsulation between the ASR1-ASR2 is added at the headers of the messages and the messages are sent to the ASR2, and the ASR2 decapsulates the messages to send to the mobile terminal.

In step 4, the system updates the terminal identification mapping relationship stored in the identity location register.

After receiving the switching response message sent by the ASR2, the ASR1 sends a switching command to the mobile node MN. The ASR1 caches the data message sent to the MN.

The system initiates the procedure of updating the mapping relationship between the ASR2 and the ILR, and the ASR2 allocates a new RIDm2 for the mobile terminal MN, the ASR2 sends the RIDm2 to the ILR, and the ILR updates and records AID-RIDm1 as AID-RIDm2.

Alternatively, as a replacement procedure of the procedure of updating the mapping relationship between the ASR2 and the ILR, the ASR1 can also initiate the procedure of updating the mapping relationship between the ASR1 and the ILR. The ASR1 obtains the RIDm2 from the ASR2, the ASR1 sends the RIDm2 to the ILR, and the ILR updates and records AID-RIDm1 as AID-RIDm2.

In step 5, the mobile node accesses the switching target cell.

The mobile node MN accesses the switching target cell after receiving the switching command sent by the ASR1, establishes the communication link with the ASR2 through the target RAN, transceives the data message through the communication link. The target RAN sends a switching completion message to the ASR2 after receiving an access indication of the MN. The ASR2 sends the switching completion message to the ASR1, and the ASR1 starts a switching timer Th.

Alternatively, the switching timer Th can also be set in the ASR2.

There is no strict temporal order for the switching completion message sent by the ASR2 and the procedure of updating the mapping relationship in step 6.

In step 6, the gateway ASR1 from which the MN is switched out forwards the data message sent by the correspondent node for the gateway ASR2 to which the MN is switched, and the ASR2 initiates a "correspondent node inquiry" procedure.

After the ASR2 receives the indication for MN accessing, for example, the switching completion message sent by the RAN-target in the procedure in FIG. 3, it initiates the procedure of "inquiring the correspondent node information" to the terminal MN, the ASR2 inquires of the terminal about the correspondent node CN which is performing the data communication with the MN at this moment, the MN sends the identity information of the correspondent node CN which is performing the data communication with the MN at this moment to the ASR2, and the ASR2 acquires the identity identification of the correspondent node CN which is performing the data communication with the MN at this moment.

During the switching, before the ASRc to which the correspondent node CN belongs does not receive the message for updating the correspondent node, the data message sent to the mobile terminal MN by the correspondent node CN will still be sent to the ASR1 through the ASRc; after the ASR1 receives these data messages, it sends the data messages to the ASR2 through the forwarding relationship established between ASR1-ASR2, and the ASR2 performs routine processing on the data messages to send to the mobile terminal MN through the RAN.

In step 7, the ASR2 initiates the "updating correspondent node mapping" procedure.

After the ASR2 acquires the identity identification information of the correspondent node CN which is performing the data communication with the MN at this moment, it initiates the "updating correspondent node mapping" procedure to the ASRc to which the correspondent node CN belongs. During the procedure of updating correspondent node mapping, the ASRc acquires the latest mapping relationship AIDm-RIDm2 of the mobile node MN, and replaces the mapping AIDm-RIDm1 of the mobile node MN stored by the ASRc locally as the AIDm-RIDm2; and the following data messages sent to mobile node MN by the ASRc will be sent directly via the path ASRc←→ASR2←→RAN←→MN, while they are not forwarded by the ASR1 any more.

In step 8, the gateway ASR1 from which the MN is switched out and the gateway ASR2 to which the MN is switched delete the forwarding relationship.

After the switching timer Th1 in the ASR1 is expired, the ASR1 deletes the forwarding relationship of the mobile node MN between the ASR1 and the ASR2. The ASR1 initiates a forwarding relationship deleting procedure to the ASR2 at the same time, and the ASR2 deletes the forwarding relationship of the mobile node MN between the ASR1 and the ASR2 in the forwarding relationship deleting procedure.

Alternatively, corresponding to the alternative method in the step 5, after the switching timer in the ASR2 is expired, the ASR2 deletes the forwarding relationship of the mobile node MN between the ASR1 and the ASR2. The ASR2 initiates the forwarding relationship deleting procedure to the ASR1 at the same time, and the ASR1 deletes the forwarding relationship of the mobile node MN between the ASR1 and the ASR2 in the forwarding relationship deleting procedure.

Embodiment Two

Figure 4:
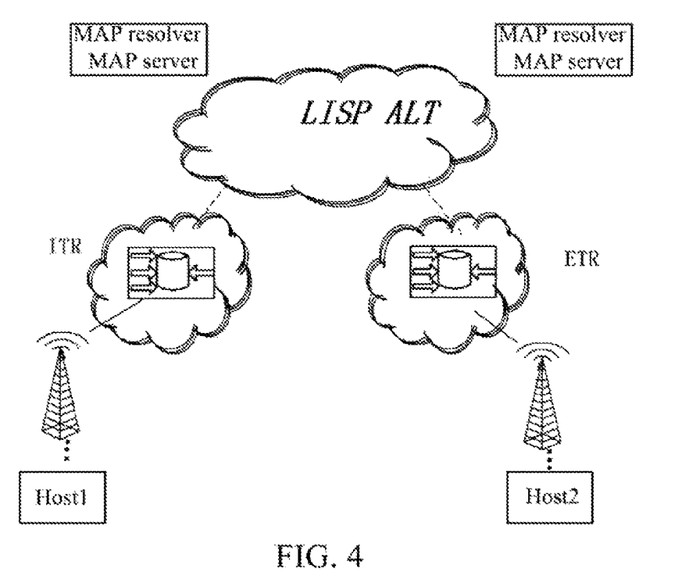
FIG. 4 is a diagram of an LISP network topology in embodiment two.

FIG. 4 is a diagram of the network topology based on the LISP in the related art. The devices in the LISP system are a Host, a boundary router ITR, an ETR and a core router. The tunnel router (TR) is deployed on the edge of the network site, the router at the tunnel ingress is an Ingress Tunnel Router (for short ITR), and the router at the tunnel egress is called an Egress Tunnel Router (for short ETR). The ITR in the LISP is responsible for encapsulating the data and searching for the mapping to search for the corresponding RLOC information according to the target EID information. One more layer LISP head is used for encapsulating outside the original host message. The ETR in the LISP is responsible for the de-capsulation of the data message. The LISP ALT plane MAP server/MAP Resolver stores the mapping relationship of EID-to-RLOC.

Figure 5:
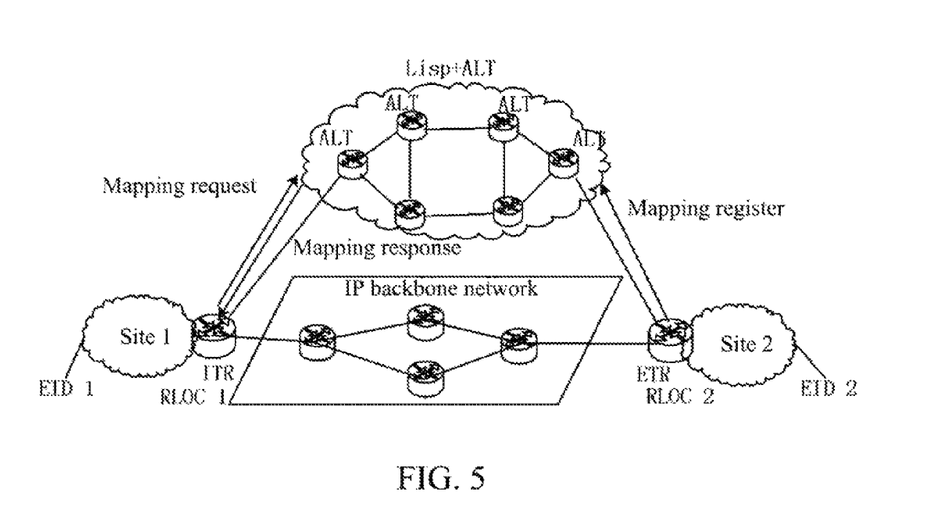
FIG. 5 is a diagram of an LISP data forwarding procedure in embodiment two.

The data forwarding procedure of the LISP protocol is shown in FIG. 5. The encapsulation of the LISP data message is completed on the ingress tunnel router ITR, and it is encapsulated with a way of "IP-IN-IP". The source IP address and the target IP address fields of the inner layer IP message header are represented by the source EID and the target EID respectively, and the source IP address and the target IP address fields of the outer layer IP message header are represented by the source RLOC and the target RLOC respectively. When the ITR receives the first message sent by the host 1, it inquires the mapping relationship of the EID-to-RLOC from the LISP ALT plan according to the target EID to store in the cache table, and the subsequent data messages sent by the host 1 are encapsulated with RLOCs and then are sent out. During the transmission in the network, the messages only require to be route addressed and forwarded according to the target RLOC in the outer IP message header, the inner layer IP header keeps unchanged during the transmission, the de-capsulation of the location-ID separation data message is completed on the egress router ETR, and the decapsulated data message is sent to the host 2 by the ETR.

Figure 6:
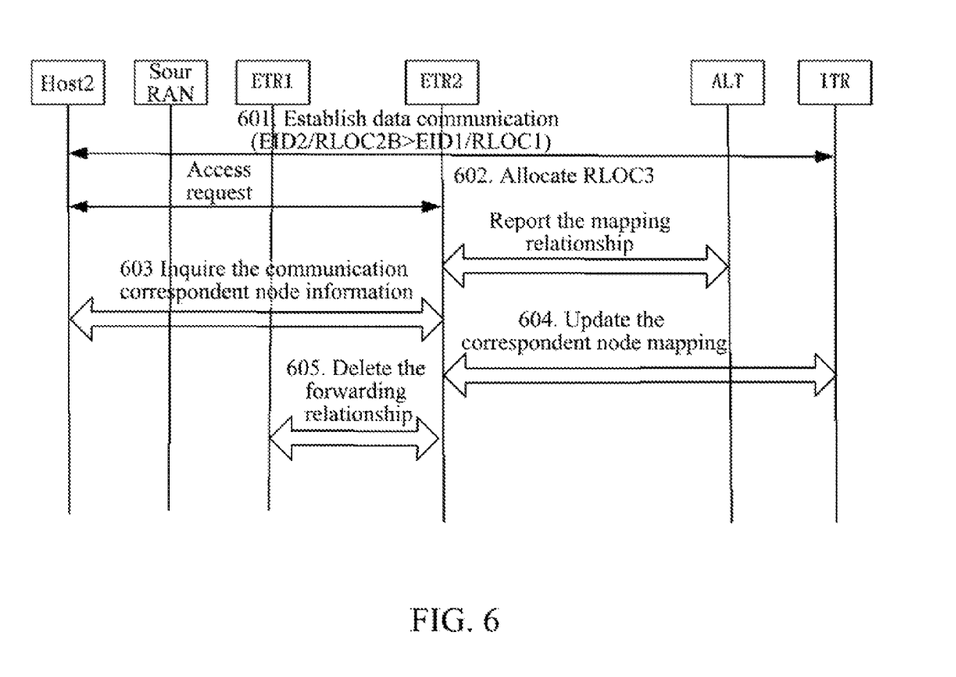
FIG. 6 is a diagram of a route optimization method and a switching management flow in embodiment two.

As shown in FIG. 6, the present embodiment describes the switching processing mechanism by taking the host 2 moving from the ETR1 to the ETR2 as the example, including the following steps:

in step 601: the host 2 moves from the ETR1 to the ETR2, and a new RLOC is allocated for the host 2.

In the communication process shown in FIG. 5, the host 1 and the host 2 establish a data communication relationship. The host 2 accesses the ETR1, the ETR1 allocates the RLOC2 for the host 2, and the host 1 and the host 2 communicate by adopting EID1/RLOC1←--> EID2/RLOC2.

The location of the host 2 moves from the area of the ETR1 to the area of the ETR2. The ETR2 detects the access of the host 2 and allocates a new ROLC3 for the host 2, and the route of the RLOC3 points to the ETR2.

The method of the ETR2 detecting the access of the host 2 includes but not limited to:

(1). The mobile cellular network mechanism is adopted. The ETR is just the access gateway (such as the SGSN/GGSN in the WCDMA, the PGW/SGW in the EPC network, etc.). When the terminal is switched cross the gateway, the gateway ETR1 from which the terminal is switched out and the gateway ETR2 to which the terminal is switched establish the signaling connection, and the gateway ETR2 to which the terminal is switched detects that the host 2 moves to the area of the ETR2 through the current mechanism of the mobile cellular network.

(2). the mobility detection mechanism similar to the MIPV4 is adopted. The ETR broadcasts the route announcement to the access network managed by itself periodically, and the host 2 monitors and receives the announcement message and detects whether the host 2 itself moves according to the content in the announcement message. After the movement, the host 2 initiates the access request to the ETR2, and the ETR2 detects the access of the host 2.

(3). the host 2 monitors the state time of the communication link at its own bottom layer to find its own movement. After the movement, the host 2 initiates the access request to the ETR2, and the ETR2 detects the access of the host 2.

In step 602: the mapping EID-to-RLOC of the ETR2 is updated, and the mapping relationship EID-to-RLOC is registered to the ALT plane.

After the ETR2 allocates the new RLOC3 for the host 2, the ETR2 updates the EID2-to-RLOC2 mapping stored locally as the EID2-to-RLOC3, and registers the new mapping relationship EID2-to-RLOC3 to the ALT plane. When the subsequent host establishes the new data communication relationship with the host 2, the ITR to which the subsequent host belongs will inquire and obtain the new mapping relationship EID2-to-RLOC3 of the host 2.

In step 603, the correspondent node information is obtained.

for the data communication relationship established by the host 1 and the host 2, the host 1 and the host 2 communicate by adopting the EID1/RLOC1←-->EID2/RLOC2. Now the data messages between the host 1 and the host 2 are received and sent through ITR←-->ETR1. The ETR2 will notify the ITR to which all the hosts communicating with the host 2 belong, to inform the host 2 of the new mapping relationship EID2-to-RLOC3. The ETR2 initiates the correspondent node inquiry procedure to the host 2. The host 2 grasps the EID information of the host which is communicating with it. Through the correspondent node inquiry procedure between the ETR2 and the host 2, the ETR2 obtains the EID information of all hosts which are communicating with the host 2.

In step 604, the ITR to which the correspondent node belongs is notified.

According to the acquired EID information of all hosts which are communicating with the host 2, the ETR2 inquires the correspondent node EID-to-RLOC information from the cache table, and initiates the mapping updating procedure to the ITR to which the correspondent node host belongs. The ITR to which the correspondent node belongs updates the original mapping relationship EID2-to-RLOC2 according to the new mapping relationship EID2-to-RLOC3 carried by the mapping updating procedure. The subsequent data messages between the host 1 and the host 2 will be received and sent through the ITR←-->ETR2.

In step 605, the ETR1 mapping information is deleted.

After the host 2 accesses the ETR2, the ETR2 will notify the ETR1 to delete the information of the host 2, including the stored mapping relationship EID2-to-RLOC2.

The method of the ETR2 notifying the ETR1 to delete the information of the host 2 includes but not limited to:

(1). the situation of the method 1) that the ETR2 detects the access of the host 2 in step 1 for example: The mobile cellular network mechanism is adopted, and the ETR is regarded as the access gateway of the terminal. In the mobility detection procedure, the gateway ETR1 from which the terminal is switched out and the gateway ETR2 to which the terminal is switched establish the communication connection. After the host 2 accesses the ETR2, the ETR2 adds a single message procedure generally, or expands the field in the existing message spread, to notify the ETR1 that the host 2 has already accesses the ETR2. The ETR1 will delete the information of the host 2, including the stored mapping relationship EID2-to-RLOC2.

(2). the situation of the method 2) and method 3) that the ETR2 detects the access of the host 2 in step 1) for example: In the switching management, the ETR1 and the ETR2 do not establish the communication connection, and the ETR2 to which the terminal is switched needs to grasp the location information of the ETR1 from which the terminal is switched out, so as to send the message for deleting the host 1 to the ETR1. After the host 2 accesses the ETR2, the ETR2 interacts with the ALT plane, gets the original mapping relationship EID2-to-RLOC2 of the host 2 from the ALT, and determines the location of the ETR1 through the RLOC2; the ETR2 interacts with the ETR1 through the messages, and notifies the ETR1 to delete the information of the host 2, including the stored mapping relationship EID2-to-RLOC2. The ETR1 executes the command.

(3). the timer T1 is set in the ETR1. The ETR1 refreshes the timer T1 when transceiving the data messages of the host 2; if there is no data message of the host 2 received or sent during the timer T1, the ETR1 will delete the information of the host 2, including the stored mapping relationship EID2-to-RLOC2.

It should be illustrated that, in a case of not conflicting, the embodiments in the present application and features in these embodiments can be combined with each other.

The present document can have a variety of other embodiments. Those skilled in the art can make the corresponding modifications and variations according to the present document without departing from the spirit and essence of the present document. And all of these modifications or variations should be embodied in the scope of the appended claims of the present document.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in a form of hardware, or in a form of software function module. The present document is not limit to any specific form of the combination of the hardware and software.

INDUSTRIAL APPLICABILITY

In the present scheme, information of a correspondent node is obtained by adding a signaling interaction procedure between the network and the terminal host, so that the information of the correspondent node which is performing data communication is obtained in real time, and a subsequent data stream route optimization process is performed in time, thereby solving the problem of low processing performance and poor real-time performance resulted from an access gateway monitoring, detecting and maintaining correspondent node information. The present scheme fully considers simplifying the switching procedure, and the access gateway does not need to maintain the correspondent node information by monitoring and detecting the data stream, which reduces the complexity of processing the data stream of the access gateway and improves the real-time performance of the correspondent node information in the mapping updating process.

What we claim is:

1. A method for route optimization during switching in an identity location separation architecture based on a network, comprising:

establishing a communication relationship between a mobile node (MN) and a correspondent node (CN), switching, by the MN, from a source access network element to a target access network element, in which the target access network element stores a mapping relationship of identity information of the MN and location information of the target access network element;

further comprising:

inquiring, by the target access network element, to the MN to obtains identity information of the CN which has the communication relationship with the MN, and after the target access network element obtains the identity information of the CN, acquiring, by the target access network element, location information of an access network element on which the CN locates, and sending the mapping relationship of the identity information of the MN and the location information of the target access network element to the access network element on which the CN locates to update a mapping relationship on the CN from a mapping relationship of identity information of the MN and location information of the source access network element to the mapping relationship of the identity information of the MN and the location information of the target access network element.

2. The method according to claim 1, wherein,
when a data message between the MN and the CN is forwarded between the source access network element and the target access network element, the data message is forwarded by means of tunnel encapsulation.

3. The method according to claim 1, wherein, the step of the target access network element inquiring the MN to obtain the identity information of the CN comprises:
initiating, by the target access network element, a procedure of inquiring the MN about information of the CN which has the communication relationship with the MN, and receiving the identity information of the CN returned by the MN.

4. The method according to claim 3, wherein,
the target access network element initiates the procedure of inquiring after receiving an access completion indication from the MN.

5. The method according to claim 1, wherein,
the access network element is an access service router (ASR) or an egress tunnel router (ETR).

6. A system for route optimization during switching in an identity location separation architecture based on a network in which a communication relationship between a mobile node (MN) and a correspondent node (CN) is established, comprising a source access network element, a target access network element and a terminal; wherein,
the target access network element is configured to: store a mapping relationship of identity information of the MN and location information of the target access network element in a process that the MN is switched from the source access network element to the target access network element, inquire the MN to obtain identity information of the CN which has the communication relationship with the MN, after obtaining the identity information of the CN, acquire location information of an access network element on which the CN locates, and send the mapping relationship of the identity information of the MN and the location information of the target access network element to the access network element on which the CN locates, so as to update a mapping relationship on the CN from a mapping relationship of identity information of the MN and location information of the source access network element to the mapping relationship of the identity information of the MN and the location information of the target access network element.

7. The system according to claim 6, wherein,
the target access network element is further configured to:
forward a data message between the MN and the CN to the source access network element by means of tunnel encapsulation, and the source access network element is further configured to: forward the data message between the MN and the CN to the target access network element by means of tunnel encapsulation.

8. The system according to claim 6, wherein, the target access network element is further configured to: initiate a procedure of inquiring the MN about information of the CN which has the communication relationship with the MN, and receive the identity information of the CN returned by the MN.

9. The system according to claim 8, wherein,
the target access network element is further configured to:
initiate the procedure of inquiring after receiving an access completion indication from the MN.

10. An access network element for route optimization during switching in an identity location separation architecture based on a network in which a communication relationship between a mobile node (MN) and a correspondent node (CN) is established, wherein, when the access network element is a target access network element to which the MN is switched from a source access network element, the access network element is configured to store a mapping relationship of identity information of the MN and location information of the target access network element; and
the access network element comprises a route optimization module, configured to: inquire the MN to obtain identity information of the CN which has the communication relationship with the MN, after obtaining the identity information of the CN, acquire location information of an access network element on which the CN locates, and send the mapping relationship of the identity information of the MN and the location information of the target access network element to the access network element on which the CN locates, so as to update a mapping relationship on the CN from a mapping relationship of identity information of the MN and location information of the source access network element to the mapping relationship of the identity information of the MN and the location information of the target access network element.

11. The access network element according to claim 10, wherein,
the route optimization module is further configured to:
forward a data message between the MN and the CN to the source access network element by means of tunnel encapsulation.

12. The access network element according to claim 10, wherein,
the route optimization module is further configured to:
initiate a procedure of inquiring the MN about information of the CN which has the communication relationship with the MN, and receive the identity information of the CN returned by the MN.

13. The access network element according to claim 12, wherein,
the route optimization module is further configured to:
initiate the procedure of inquiring after receiving an access completion indication from the MN.

14. The access network element according to claim 10, wherein,
the access network element is an access service router (ASR) or an egress tunnel router (ETR).

* * * * *